Dec. 30, 1958  H. B. THOMPSON  2,866,611
MECHANICAL STICK FORCE PRODUCER
Filed Feb. 15, 1954  2 Sheets-Sheet 1

INVENTOR:
Hugh B. Thompson
By Hubert E. Metcalf
His Patent Attorney

Dec. 30, 1958 H. B. THOMPSON 2,866,611
MECHANICAL STICK FORCE PRODUCER
Filed Feb. 15, 1954 2 Sheets-Sheet 2
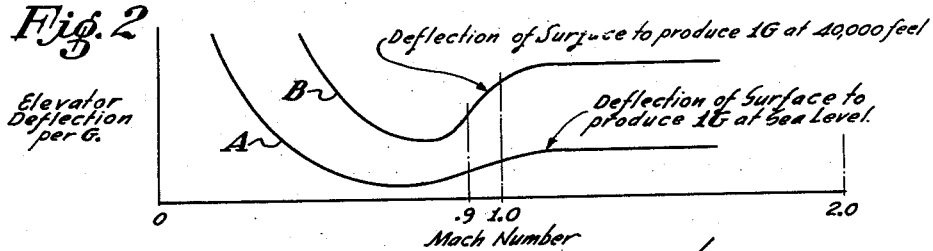
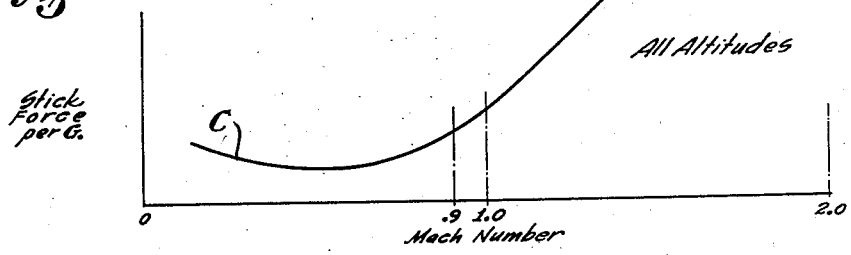
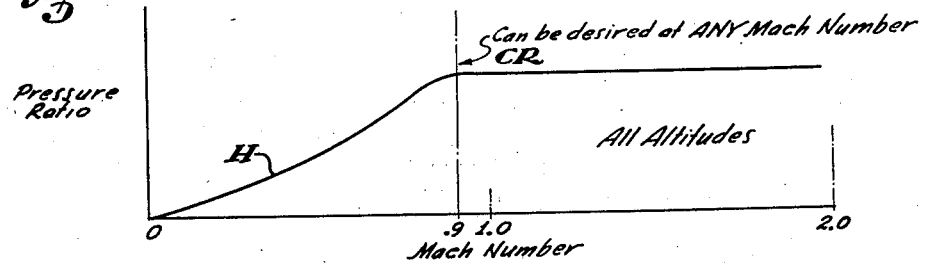
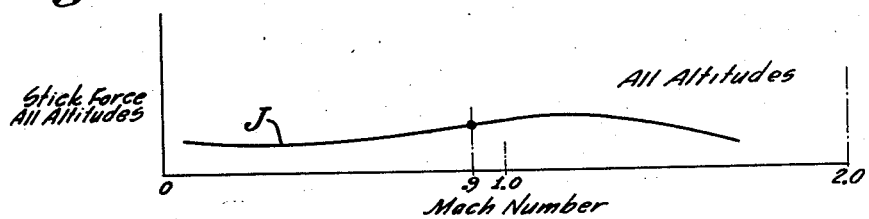
INVENTOR:
Hugh B. Thompson
By Hubert E. Metcalf
His Patent Attorney

United States Patent Office 2,866,611
Patented Dec. 30, 1958

2,866,611

MECHANICAL STICK FORCE PRODUCER

Hugh B. Thompson, Redondo Beach, Calif., assignor to Northrop Aircraft, Inc., Hawthorne, Calif., a corporation of California Application February 15, 1954, Serial No. 410,140

5 Claims. (Cl. 244—83)

My invention relates to stick force producers in airplanes wherein attitude control surfaces are moved under full power in accordance with signals from the pilot, without surface load feed-back to the pilot.

In airplanes utilizing fully powered attitude controls, such as, for example, the hydraulic controls shown, described and claimed in U. S. Patent No. 2,640,466 by Feeney, issued June 2, 1953, it is desirable that a synthetic feel be imparted to the pilot's control element (wheel or stick) particularly when the control stick is moved to control the elevators of the airplane. One type of stick force producer found to be satisfactory comprises a diaphragm having ram air pressure on one side thereof, and static pressure on the other, the force exerted by the diaphragm being applied to the stick on either side of neutral. Such a device provides higher and higher forces on the stick as speed of the airplane increases, thereby simulating the increasing airloads on the control surface itself.

However, modern military airplanes, for example, are now operable at both subsonic speed and supersonic Mach numbers, and it has been found that for airplanes equipped with air speed responsive force producers the stick force per g (g=gravity acceleration) rises so rapidly after Mach number 1. has been passed, that the pilot has difficulty moving the stick for proper control.

It is therefore an object of the present invention to provide a stick force producer which will produce a substantially constant stick force per g over a wide speed range, particularly near and above, Mach number 0.9, for example.

It is another object of the invention to provide a stick force producer operated in accordance with the ratio of ram air pressure to static air pressure, wherein means are provided to regulate the ratio.

Other objects will be seen as the specification continues.

Briefly, the present invention in one form comprises, in conjunction with a fully powered airplane attitude control system, a diaphragm connected on one side to ram air system, and a connection to substantially static air pressure on the other side of the diaphragm. As speed increases, the ratio of ram air pressure to static air pressure rises and the diaphragm tends to move. The diaphragm is linked to the control stick in such a manner as to apply diaphragm force in a direction to center the control stick at a neutral position. In order that the ratio of ram pressure to static pressure be controlled, a by-pass is provided around the diaphragm, and a valve is inserted therein, permitting the pressure ratio to build up to a predetermined value; and thereafter to maintain substantially the same ratio value at all higher speeds and higher pressure source pressures.

My invention will be more fully understood by reference to the drawings in which:

Figure 2 is a simplified diagram showing coordinate curves representing elevator deflections per g plotted against Mach number.

Figure 3 is a simplified diagram showing a curve representing stick force per g plotted against Mach number, using a conventional force producer as previously described herein.

Figure 4 is a simplified diagram showing a curve representing the pressure ratios plotted against Mach number, as found in the force producer of the present invention.

Figure 5 is a simplified diagram showing coordinate curves representing elevator deflections per g plotted against Mach number, using the force producer of the present invention.

Figure 1:
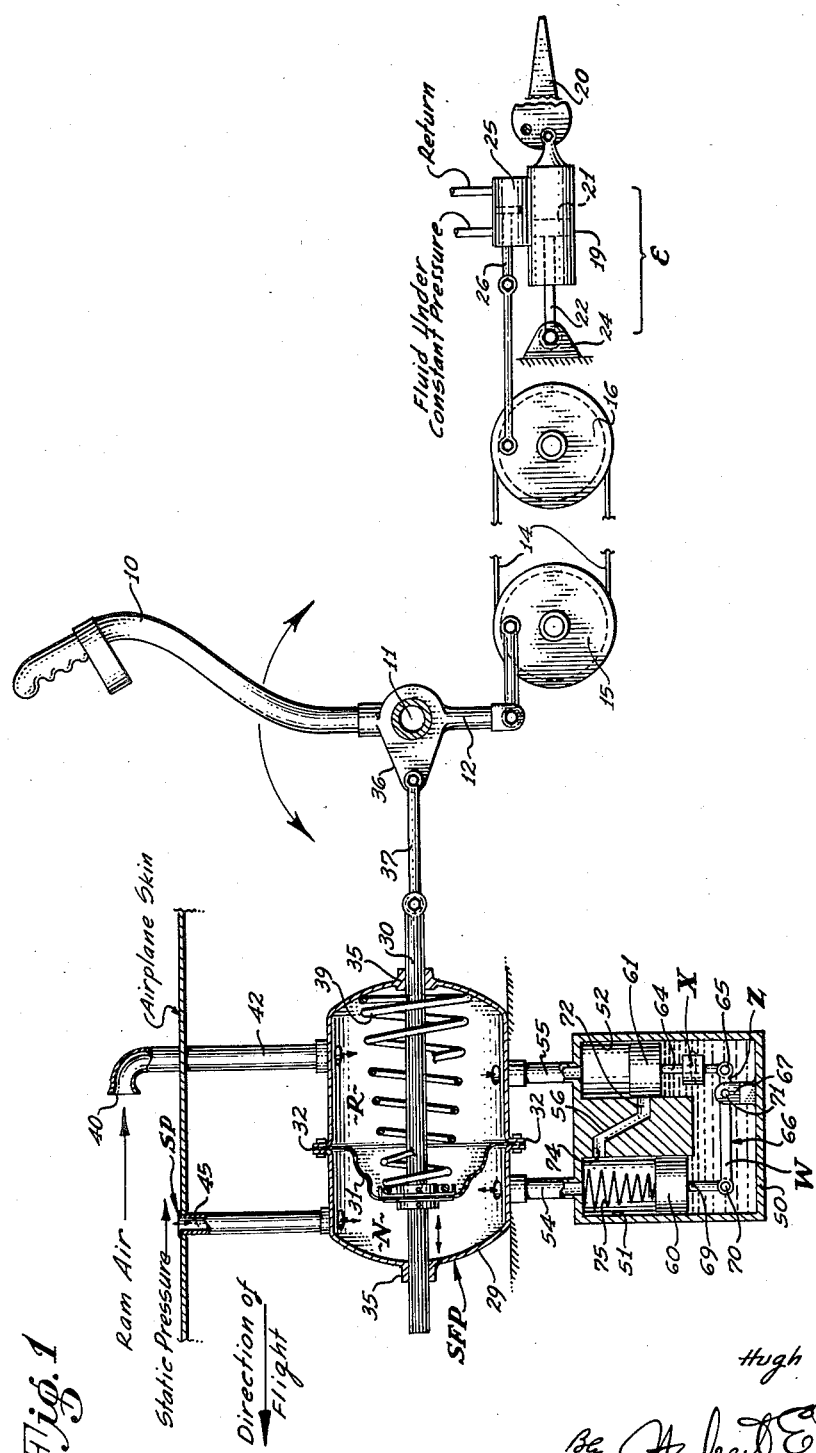
Figure 1 is a simplified diagram of a fully powered airplane attitude control system showing the use of a preferred form of the present invention.

Referring first to Figure 1, a fully powered airplane attitude control system suitable for use to control the elevators of the airplane is shown diagrammatically. A control stick 10 is provided, movable fore and aft as indicated by arrows, on pivot 11. As is customary this stick can also be moved laterally for aileron control. An actuating arm 12 projects from stick 10 below pivot 11 and the end of this arm is connected to move a control cable 14. Control cable 14 passes around a forward pulley 15 and a rear pulley 16; the latter being near an elevator actuator assembly E.

The elevator actuator comprises a hydraulic cylinder 19, one end of which is connected to move an elevator surface 20. A piston 21 is positioned in cylinder 19, the piston rod 22 of the piston passing through the other end of cylinder 19 to be attached to an airframe fitting 24. Differential pressure of hydraulic fluid in the cylinder spaces on each side of piston 21 and the resulting movement thereof will create elevator 20 movement. The hydraulic fluid of the airplane hydraulic system (not shown) is under the control of a valve (not shown) mounted in casing 25 which is attached to the hydraulic cylinder 19 in the usual manner, the valve being moved by valve stem 26 projecting forwardly from casing 25. This stem 26 is attached to the rear pulley 16 on a 90° radius thereby providing valve stem movement as the rear pulley 16 is rotated.

Thus stick movement causes valve movement, controlling the flow of hydraulic fluid under constant pressure to one side or the other of piston 21. In the system just described, stick forces of only a few ounces are needed to move valve stem 26 thereby causing sufficient force to be applied to the surface to counteract the maximum design airload thereon over full elevator travel. An actuator assembly E of the type described is shown, disclosed, and claimed in the Feeney patent above cited.

Because no surface air load forces are ever fed back to the pilot in such a full powdered system, a synthetic "feel" is preferably provided as for example by a stick fore producer assembly SFP.

This assembly comprises a casing 29; this casing supporting a central operating rod 30 and a flexible diaphragm 31. The periphery of the diaphragm 31 is connected to the central casing at abutting shoulders 32 thereof, and connected at the center to rod 30. Rod 30 slides axially in casing end bearings 35.

Operating rod 30 is connected at one end outside of casing 29 to a stick arm 36 extending forwardly from the region of the pivot 11 by a drag link 37. Diaphragm 31 is biased forwardly in casing 29 by casing spring 39. The straight line geometry of the casing 29, rod 30, link 37, arm 36, and pivot 11 is such as to cause spring 39 to normally hold stick 10 in its neutral position. Any movement of stick 10 from this normal neutral position will be opposed by the force of spring 39 as it is compressed.

Diaphragm 31 is also subjected to another force which varies in accordance with airspeed, as provided by a ram air scoop 40 on the outside of the airplane; the air picked up thereby being ducted to casing 29 on the spring side R of diaphragm 31 by ram air duct 42. The opposite side N of diaphragm 31 is connected with an opening SP on the exterior of the airplane that is located in substantially static pressure during flight, through a static pressure duct 45.

For certain types of aircraft, a typical elevator deflection per g as plotted against Mach number is shown in Figure 2. Here, a curve A shows the amount of control surface deflection required to produce an acceleration of one g at sea level for Mach numbers ranging above and below Mach number 1.0. Curve B shows control surface deflections required at 40,000 feet altitude.

If then the stick force per g as produced by the stick force producer, SFP just above described, is plotted against Mach number, a curve will result somewhat as shown in Figure 3 by curve C, this curve being substantially the same at all altitudes.

From the curve C of Figure 3 it can readily be seen that at Mach numbers ranging below about Mach number 0.9 for example, the stick force producer will provide a substantially constant stick force per g. It can be readily seen that with Mach numbers increasing above about Mach number 0.9 the stick force per g can become excessive for proper control of the airplane.

From the illustrated curves it will be clear that if the ratio of ram pressure to static pressure in a force producer such as SFP, for example, is maintained close to some predetermined constant value, say the value existing at Mach number 0.9, a substantially constant stick force per g can be closely approached.

Figure 4 shows the stick force per g plotted by curve H against Mach number, where the ratio of ram pressure to static pressure is held substantially constant above Mach number 0.9.

The curve J of Figure 5 shows only a variation of about a factor of two in stick force per g over the entire speed range, which factor is considered excellent as judged by present day standards for high speed airplane control.

The curve J of Figure 5 can be obtained in stick force producer systems of the type SFP, for example, by utilizing a controlled by-pass between the static and dynamic air chambers N and R, respectively, of the force producer SFP; this by-pass being diagrammatically shown in Figure 1. As shown there, an air tight casing 50 is provided with cylinders 51 and 52. Cylinder 51 is a static pressure cylinder, the top of which is connected by static pressure line 54 to the static pressure chamber N of the force producer SFP. Cylinder 52 is a ram pressure cylinder, the top of which is connected by ram pressure line 55 to ram pressure chamber R of the force producer SFP. A by-pass duct 56 connects the two cylinders 51 and 52.

A static piston 60 is installed in static pressure cylinder 51 and a ram pressure piston 61 is provided in ram pressure cylinder 52; these pistons and their respective cylinders preferably having substantially the same cross sectional areas.

A ram pressure piston rod 64 extends downwardly from piston 61 to pivot on one end 65 of a walking beam 66, mounted on a fulcrum bracket 67 in the fluid casing 50, and a static pressure piston rod 69 extends downwardly to contact and pivot on the other end 70 of walking beam 66. The fulcrum pin 71 is positioned to proportion lever arms W and Z of the walking beam 66 to provide the desired maximum pressure ratio in the force producer SFP. This ratio will of course vary in accordance with the speed range and force producer characteristics of the particular airplane in which the system is installed, and can readily be determined by those skilled in the art.

In addition, it is preferred to mass balance the system, as for example, by weighting ram pressure piston rod 64 by means of a weight X.

Damping can be provided in any convenient manner such as by fluid, or by mechanical means such as a simple dash-pot (not shown) for example.

The pistons 60 and 61 are installed so that at zero pressure ratio, ram pressure piston 61 covers the opening 72 of by-pass duct 56 into ram pressure cylinder 52 and static pressure piston 60 will be positioned well below the opening 74 of the by-pass duct 56 into static pressure cylinder 51; the latter piston being positioned sufficiently below that opening so that static pressure piston 60 will never cut off flow through by-pass duct 56. It is preferred however to insert a spring 75, having a very low spring constant, between the top of static pressure cylinder 51 and static pressure piston 60 so that the ram pressure piston 61 will always be returned to close the by-pass duct 56 at low ram pressures.

The valve arrangement above described will provide a pressure ratio curve, at all altitudes and at various Mach numbers, substantially the same as shown by curve in Figure 5, and by proportioning the relative lengths of the lever arms W and Z, the constant pressure value of Mach number, as indicated by arrow CR in Figure 5, can be made to occur at any desired Mach number, at Mach number 0.9 for example, as shown.

In operation, when the airplane is at rest and no ram pressure exists, ram pressure piston 61 closes off by-pass duct 56. In flight, as the ram-static pressure ratio increases, the ram pressure piston moves downwardly in ram pressure cylinder 52 under the influence of ram air over static air, until the pressure ratio at the desired Mach number is reached, whereby the by-pass duct 56 starts to be opened by the downwardly moving piston 61. As the pressure ratio increases still further, piston 61 moves further downwardly and opens the by-pass duct to by-pass more and more air from ram pressure chamber R to static chamber N to hold the pressure ratio substantially constant across the diaphragm 31 which, as above described, is linked to the stick 10.

While the system as above described allows air to flow through the system, the amount of air flow can be kept relatively low by the use of as small connection lines as are consistent with minimum lag introduction into the system.

It should be further pointed out that various characteristics of the system, as described herein, are readily variable to suit individual conditions. For example, in certain airplane designs it may be desirable to modulate the load factor of the by-pass system. This can readily be accomplished in several ways, such as by adjusting weight X for example, or the power of spring 75. Springs can also be applied to lever arms W and Z to modulate the pressure ratios. It is noted that springs provide absolute magnitude forces which will modify the pressure ratio as the flight attitude changes, and such modification may be desirable for certain airplane designs. All of such modification is deemed within the knowledge of one skilled in the art.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an airplane, a pilot's attitude control element, means for producing a force representing a differential ratio between ram air pressure and substantially static pressure on said airplane in flight, means for applying said force to tend to center said control element in a neutral position, said means including an enclosed pressure movable member connected on one side thereof to said control element, means leading ram air pressure from a source thereof to one side of said member, means leading static pressure from a source thereof to the other side of said member, a valve connected between the ram air pressure side of said member and the static air pressure side thereof, a first cylinder in said valve and connected to the ram air pressure side of said member, a second cylinder in said valve and connected to the static air pressure side of said member, a duct in said valve, said duct having one end thereof opening in said first cylinder, the other end of said duct opening into said second cylinder, a piston mounted in said first cylinder and movable therein under the influence of pressure from the ram air pressure side of said member, a piston mounted in said second cylinder and movable therein under the influence of pressure from the static air pressure side of said members, means interconnecting said pistons to maintain a given ratio of movement therebetween, said first piston being movable across said duct opening to control the flow of ram air pressure through said duct to the static side of said member, said second piston modifying movement of said first piston in accordance with ambient static air pressure, whereby said first piston is operable to open said duct to permit ram air pressure to pass therethrough to the static air side of said member whenever the ram air pressure on the appropriate side of said member exceeds a predetermined value, thereby maintaining said force substantially constant at pressure ratios exceeding said predetermined pressure ratio.

2. In an airplane, a pilot's attitude control element, means for producing a force representing a differential ratio between ram air pressure and substantially static pressure on said airplane in flight, means for applying said force to tend to center said control element in a neutral position, said means including an enclosed pressure movable member connected on one side thereof to said control element, means leading ram air pressure from a source thereof to one side of said member, means leading static pressure from a source thereof to the other side of said member, a valve connected between the ram air pressure side of said member and the static air pressure side thereof, an air passage through said valve and connecting one side of said member with the other side thereof, a first cylinder in said valve intermediate said ram air pressure side of said member and said passage, a second cylinder in said valve intermediate said static air side of said member and said passage, piston means movable in each of said cylinders under the influence of said ram air pressure and said static air pressure to control the flow of ram air pressure through said passage in accordance with the ratio of said ram air to said static air, lever means interconnecting said piston means to impart differential motion therebetween, said piston means being operable to open said passage to by-pass ram air pressure to the static side of said member at a predetermined value of said ram air pressure in accordance with a predetermined airspeed, whereby said force is maintained substantially constant during airspeed in excess of said predetermined airspeed, and means for regulating the value of said predetermined pressure value.

3. In an airplane, a pilot's attitude control element, means for producing a force representing a differential ratio between ram air pressure and substantially static pressure on said airplane in flight, means for applying said force to tend to center said control element in a neutral position, said means including an enclosed pressure movable member connected on one side thereof to said control element, means leading ram air pressure from a source thereof to one side of said member, means leading static pressure from a source thereof to the other side of said member, a valve connected between the ram air pressure side of said member and the static air pressure side thereof, a first cylinder in said valve and connected to the ram air pressure side of said member, a second cylinder in said valve and connected to the static air pressure side of said member, a duct in said valve, said duct having one end thereof open in said first cylinder, the other end of said duct being open in said second cylinder, a piston mounted in said first cylinder and movable therein under the influence of ram air pressure, a piston mounted in said second cylinder and movable under the influence of static air pressure, a differential link connected at one end thereof to one of said pistons, the other end of said link being connected to the other piston, a fulcrum pivot between the ends of said link, said pivot being located at a predetermined point between the ends of said link to provide a desired ratio of movement between said pistons, the movement of said piston in said second cylinder under the influence of static air pressure being transmitted through said link to modify movement of said piston in said first cylinder, said piston in said first cylinder being movable under ram air pressure against static air pressure to open said duct when ram air pressure exceeds a predetermined value to by-pass ram air pressure to the static air pressure side of said member, whereby said force is maintained substantially constant at ram air pressure exceeding said predetermined value.

4. In an airplane, a pilot's attitude control element, means for producing a force representing a differential ratio between ram air pressure and substantially static pressure on said airplane in flight, means for applying said force to tend to center said control element in a neutral position, said means including an enclosed pressure movable member connected on one side thereof to said control element, means leading ram air pressure from a source thereof to one side of said member, means leading static pressure from a source thereof to the other side of said member, a valve connected between the ram air pressure side of said member and the static air pressure side thereof, a first cylinder in said valve communicating with the ram air pressure side of said member, a second cylinder in said valve communicating with the static air side of said member, a duct in said valve, said duct having one end thereof open in said first cylinder, the other end of said duct being open in said second cylinder, a piston mounted in said first cylinder and movable therein under the influence of ram air pressure, a piston mounted in said second cylinder and movable under the influence of static air pressure, a differential lever connected at one end thereof to one of said pistons, the other end of said lever being connected to the other piston, fulcrum means positioned between the ends of said lever, said lever being connected to pivot on said fulcrum means, said fulcrum means being movable between said two ends to vary the ratio of movement at one end of said lever to movement at the other end, the movement of said piston in said second cylinder under the influence of static air pressure being transmitted through said lever to modify movement of said piston in said first cylinder under the influence of ram air pressure, elastic means interposed between the static pressure side of said member and said piston in said second cylinder and tending to gently urge said piston in a direction to return said piston in said first cylinder to cover said duct opening therein when said ram air pressure is relatively low, said piston in said first cylinder being movable under relatively high ram air pressure to move in a direction to open said duct opening to by-pass ram air pressure in excess of a predetermined value to said static air side of said member to maintain said force substantially constant at ram air pressures in excess of said predetermined value.

5. In an airplane, a pilot's attitude control element force producing means for exerting a centering force against said control element representing a differential ratio between ram air pressure and substantially static pressure on said airplane in flight, said means including an enclosed pressure movable member connected on one side thereof to said control element, means leading ram air pressure from a source thereof to one side of said member, means leading static pressure from a source thereof to the other side of said member, a first valve member for measuring the value of said ram air pressure, a second valve member for measuring the value of said static pressure, said valve members being interconnected for relative movement, and by-pass means defining a passage between the ram air pressure side of said member and the static pressure side thereof, said valve members being relatively movable to open and close said passage in accordance with variations in the value of said ram air pressure.

References Cited in the file of this patent
UNITED STATES PATENTS

| | | |
|---|---|---|
| 1,692,034 | Griffin | Nov. 20, 1928 |
| 2,069,214 | Carlson | Feb. 2, 1937 |
| 2,205,610 | Van Ness | June 25, 1940 |
| 2,508,883 | Knowler et al. | May 23, 1950 |
| 2,582,348 | Northrop et al. | Jan. 15, 1952 |
| 2,596,242 | Hill | May 13, 1952 |
| 2,638,289 | McKellar et al. | May 12, 1953 |